Feb. 16, 1932.  M. K. PARKHURST  1,845,438
CLAMP BLOCK
Filed May 24, 1930    2 Sheets-Sheet 1
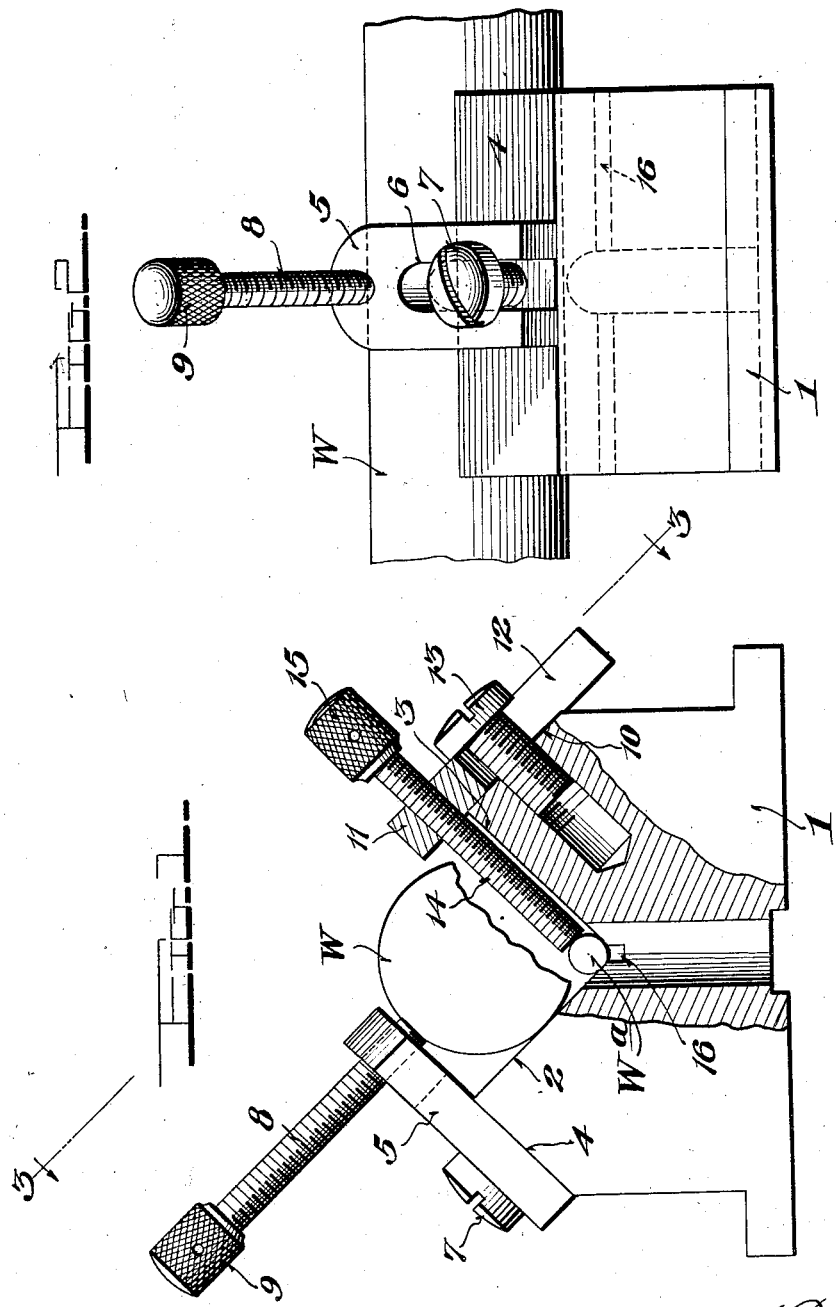

Feb. 16, 1932.　　　M. K. PARKHURST　　　1,845,438
CLAMP BLOCK
Filed May 24, 1930　　　2 Sheets-Sheet 2
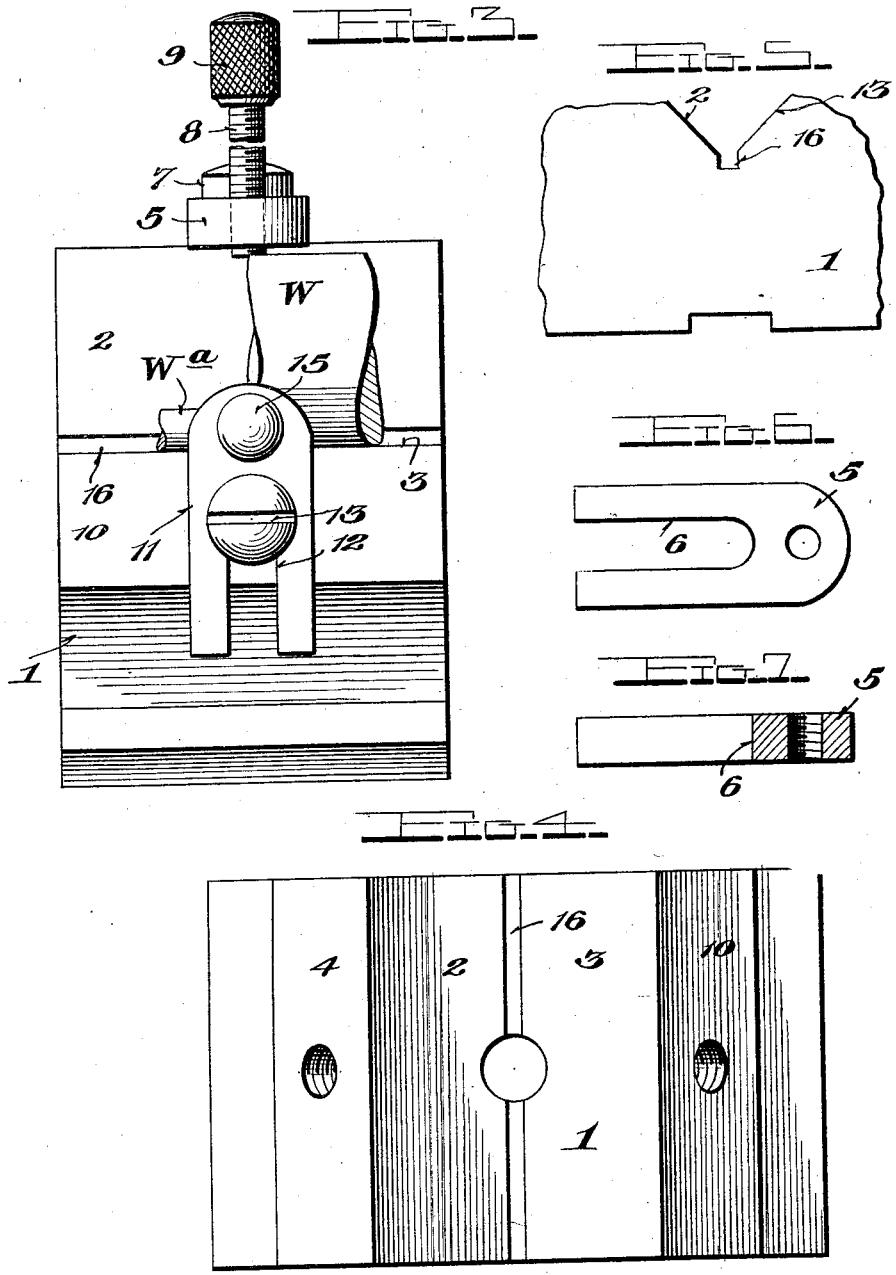

Patented Feb. 16, 1932

1,845,438

UNITED STATES PATENT OFFICE

MALCOLM K. PARKHURST, OF NEW YORK, N. Y., ASSIGNOR TO BROWN & SHARPE MFG. CO., OF PROVIDENCE, RHODE ISLAND

CLAMP BLOCK

Application filed May 24, 1930. Serial No. 455,248.

This invention relates to certain new improvements in clamp blocks employed particularly for accurately locating work in the inspection thereof or production and the primary object of the invention is to improve and simplify blocks of this type thereby to facilitate operation on the work.

A further object of the invention is to provide a block of this type which has means for the holding of work of varying diameters, and otherwise generally aims to simplify and improve blocks of this type.

In the drawings:

Figure 1 is a front end elevation partly broken away;

Figure 2 is a side elevation;

Figure 3 is a view similar to Figure 2 but taken from the opposite side of the block, along the line 3—3;

Figure 4 is a top plan view of the block with the brackets removed;

Figure 5 is a fragmentary side elevation showing the graduations applied to the front of the block and employed in calipering of the work;

Figure 6 is a detail top plan view of one of the brackets and

Figure 7 is a longitudinal sectional view of Figure 6.

In proceeding in accordance with the present invention a block 1 is employed which at its top is formed with right angularly related faces 2 and 3 between and with which the work is engaged. One side of the block is formed with a face 4 which is parallel to the face 3 and receives thereon a bracket 5, the bracket having a slot 6 through which is projected a screw 7, the screw being threaded into the block and by manipulation thereof permits the bracket to be adjusted longitudinally of the latter and then clampingly secured to the block. A work engaging screw 8 is threaded through the upper end of the bracket 5 and has a knurled head 9 for manual manipulation.

The opposite side of the block is formed with a face 10 similar to the face 4 and with which is engaged a bracket 11 corresponding to the bracket 5, the bracket 11 being slotted at 12 to receive a set screw 13 by means of which same is adjustably clamped to the block and further has a work engaging screw 14 with a knurled head 15 as in the instance of the screw 8. It will be noted that the two brackets, together with their clamping means and their work engaging screws are identical in construction, hence same cannot only be more economically produced, requiring but a single set of dies etc., or molds in the production thereof, but are also interchangeable.

Referring to Figure 1 it will be noted that in measuring work of large diameter as indicated at W the same is engaged with the two faces 2 and 3 and the desired bracket is moved to bring the work engaging screw thereof, here shown as 8 approximately diametrically of the work, whereupon screw is tightened to fixedly clamp the work against the faces 2 and 3.

Thus the work is engaged at three points and is securely held. In the instance of work of small diameter such as Wa, the bracket is moved to dispose the desired screw, here shown at 14 diametrically of the work, whereupon the screw is tightened to secure the work as shown. Preferably an enlarged groove 16 is formed at the bottom of the faces 2 and 3, so as to assure the work being engaged at two definite points, on the faces 2 and 3.

The block is particularly adaptable when it is desired to operate on the top of the work, as for instance, if a key-way is to be formed in the work the bracket 11 can be adjusted in position as bracket 5 and the screw 14 brought in contact with the work, thus the work will not only be in contact with the two faces 2 and 3 but will be held at two contact points by the screws 8 and 14 and at the same time the upper surface of the work will be fully exposed and can be operated upon without the clamping device interfering in any manner.

Having thus described my invention, what I claim as new and desire to secure by Letters Patent is:—

1. In a device of the type set forth, a block having substantially right angularly related faces at its top and having side faces opposite to and substantially parallel to the respective right angularly related faces, a longitudinally slotted bracket seated on each side face, a screw projected through the slot of each bracket and into the block to adjustably hold the bracket on the block, and a work engaging screw carried by each bracket.

2. In a device of the type set forth, a block having substantially right angularly related faces at its top and having side faces opposite to and substantially parallel to the respective right angularly related faces, a bracket on each side face, means to adjustably secure each bracket to the block, and work engaging means carried by each bracket to clamp the work against the right angularly related faces.

3. In combination with a block having a substantially central V-shaped part providing two inner side faces, and further having outer side faces which are substantially parallel to the respective opposite inner side faces, a bracket secured to each of said outer side faces and having free upper ends which latter lie substantially parallel to the respective opposed inner side faces, and adjustable work engaging means carried by the free end portion of each of the brackets.

4. In combination with a block having an upper V-shaped part providing a pair of inner side faces, and further having an inclined outer side face, a supporting member secured to said inclined outer side face and being adjustable transversely of said outer side face and having a free end which extends into the space between the inner side faces, and work engaging means carried by the free end portion of said supporting member and disposed substantially parallel to the adjacent one of said side faces of the V-shaped part.

5. In combination with a block having a substantially V-shaped upper part providing two side faces, a supporting member, means to secure said member to the block at a point outwardly beyond the said side faces of the V-shaped part, a work engaging screw carried by said member and disposed substantially parallel to the adjacent one of said side faces of the V-shaped part to impinge the work against the side face of the part that lies opposite to the screw, and means whereby to effect adjustment of said screw laterally thereof thereby to vary the space between the screw and said adjacent side face of the V-shaped part.

6. In combination with a block having a substantially V-shaped upper part providing two side faces, a supporting member, means to secure said member to a side of the block at points outwardly beyond the adjacent side face of the V-shaped part and in a plane substantially parallel and opposite to the other side face of the V-shaped part, and work engaging means adjustably carried by said member and having its longitudinal axis disposed in a plane substantially parallel to the said other side face of the V-shaped part to impinge the work against the side face of the V-shaped part that lies opposite to the work engaging means.

In testimony whereof I have signed my name to this specification.

MALCOLM K. PARKHURST.